US008712758B2

(12) United States Patent
Crouch et al.

(10) Patent No.: US 8,712,758 B2
(45) Date of Patent: Apr. 29, 2014

(54) COREFERENCE RESOLUTION IN AN AMBIGUITY-SENSITIVE NATURAL LANGUAGE PROCESSING SYSTEM

(75) Inventors: Richard Crouch, Cupertino, CA (US); Martin Henk Van den Berg, Palo Alto, CA (US); Franco Salvetti, San Francisco, CA (US); Giovanni Lorenzo Thione, San Francisco, CA (US); David Ahn, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 874 days.

(21) Appl. No.: 12/200,962

(22) Filed: Aug. 29, 2008

(65) Prior Publication Data

US 2009/0076799 A1    Mar. 19, 2009

Related U.S. Application Data

(60) Provisional application No. 60/969,426, filed on Aug. 31, 2007, provisional application No. 60/969,483, filed on Aug. 31, 2007, provisional application No. 60/969,486, filed on Aug. 31, 2007.

(51) Int. Cl.
*G06F 17/20* (2006.01)
*G06F 17/27* (2006.01)

(52) U.S. Cl.
USPC .................................................. 704/9; 704/1

(58) Field of Classification Search
USPC .............................................................. 704/9
See application file for complete search history.

(56) References Cited

U.S. PATENT DOCUMENTS 4,876,643 A   10/1989   McNeill et al.
5,519,608 A    5/1996   Kupiec
(Continued)

FOREIGN PATENT DOCUMENTS

CN    1606004 A    4/2005
CN    1658188 A    8/2005
(Continued)

OTHER PUBLICATIONS

Tiwari, "Entity Identification on the Web", Master's thesis, School of Information Technology, Indian Institute of Technology, Bombay, 2005.*

(Continued)

*Primary Examiner* — Richemond Dorvil
*Assistant Examiner* — Olujimi Adesanya
(74) *Attorney, Agent, or Firm* — Dave Ream; Jim Ross; Micky Minhas (57) ABSTRACT

Technologies are described herein for coreference resolution in an ambiguity-sensitive natural language processing system. Techniques for integrating reference resolution functionality into a natural language processing system can processes documents to be indexed within an information search and retrieval system. Ambiguity awareness features, as well as ambiguity resolution functionality, can operate in coordination with coreference resolution. Annotation of coreference entities, as well as ambiguous interpretations, can be supported by in-line markup within text content or by external entity maps. Information expressed within documents can be formally organized in terms of facts, or relationships between entities in the text. Expansion can support applying multiple aliases, or ambiguities, to an entity being indexed so that all of the possibly references or interpretations for that entity are captured into the index. Alternative stored descriptions can support retrieval of a fact by either the original description or a coreferential description.

16 Claims, 5 Drawing Sheets

(56) References Cited

U.S. PATENT DOCUMENTS

| | | | |
|---|---|---|---|
| 5,530,939 | A | 6/1996 | Mansfield, Jr et al. |
| 5,696,962 | A | 12/1997 | Kupiec |
| 5,794,050 | A * | 8/1998 | Dahlgren et al. ............. 717/144 |
| 5,933,822 | A | 8/1999 | Braden-Harder et al. |
| 6,076,051 | A | 6/2000 | Messerly |
| 6,161,084 | A | 12/2000 | Messerly |
| 6,185,592 | B1 | 2/2001 | Boguraev et al. |
| 6,189,002 | B1 | 2/2001 | Roitblat |
| 6,243,670 | B1 | 6/2001 | Bessho et al. |
| 6,246,977 | B1 | 6/2001 | Messerly et al. |
| 6,269,368 | B1 | 7/2001 | Diamond |
| 6,298,350 | B1 | 10/2001 | Lakayev et al. |
| 6,343,266 | B1 * | 1/2002 | Paul et al. ............. 704/9 |
| 6,366,908 | B1 | 4/2002 | Chong et al. |
| 6,374,209 | B1 | 4/2002 | Yoshimi et al. |
| 6,654,740 | B2 | 11/2003 | Tokuda et al. |
| 6,675,159 | B1 | 1/2004 | Klein et al. |
| 6,678,686 | B1 | 1/2004 | Patel et al. |
| 6,679,677 | B2 | 1/2004 | Yamauchi |
| 6,741,981 | B2 | 5/2004 | McGreevy |
| 6,766,316 | B2 | 7/2004 | Caudill et al. |
| 6,766,320 | B1 | 7/2004 | Wang et al. |
| 6,795,820 | B2 | 9/2004 | Barnett |
| 6,823,301 | B1 | 11/2004 | Ishikura |
| 6,842,730 | B1 | 1/2005 | Ejerhed et al. |
| 6,871,199 | B1 | 3/2005 | Binnig et al. |
| 6,901,399 | B1 | 5/2005 | Corston |
| 6,947,923 | B2 | 9/2005 | Cha et al. |
| 6,968,332 | B1 | 11/2005 | Milic-Frayling |
| 7,016,828 | B1 | 3/2006 | Coyne et al. |
| 7,027,974 | B1 | 4/2006 | Busch et al. |
| 7,031,910 | B2 | 4/2006 | Eisele |
| 7,035,789 | B2 | 4/2006 | Abrego et al. |
| 7,120,574 | B2 | 10/2006 | Troyanova et al. |
| 7,171,349 | B1 | 1/2007 | Wakefield et al. |
| 7,184,950 | B2 | 2/2007 | Weise |
| 7,194,406 | B2 | 3/2007 | Ejerhed et al. |
| 7,225,121 | B2 * | 5/2007 | Maxwell et al. ............. 704/9 |
| 7,269,594 | B2 | 9/2007 | Corston-Oliver |
| 7,302,382 | B2 * | 11/2007 | Maxwell, III ............. 704/4 |
| 7,319,951 | B2 | 1/2008 | Rising et al. |
| 7,346,490 | B2 | 3/2008 | Fass et al. |
| 7,389,224 | B1 | 6/2008 | Elworthy |
| 7,398,196 | B1 * | 7/2008 | Liu et al. ............. 704/1 |
| 7,398,201 | B2 | 7/2008 | Marchisio |
| 7,401,077 | B2 | 7/2008 | Bobrow et al. |
| 7,403,938 | B2 | 7/2008 | Harrison et al. |
| 7,593,845 | B2 | 9/2009 | Ramsey |
| 7,801,723 | B2 * | 9/2010 | Kaplan et al. ............. 704/9 |
| 7,813,916 | B2 * | 10/2010 | Bean ............. 704/9 |
| 2002/0091684 | A1 | 7/2002 | Nomiyama et al. |
| 2002/0188586 | A1 | 12/2002 | Veale |
| 2003/0130976 | A1 * | 7/2003 | Au ............. 706/55 |
| 2003/0233224 | A1 | 12/2003 | Marchisio et al. |
| 2004/0103090 | A1 | 5/2004 | Dogl et al. |
| 2004/0243554 | A1 | 12/2004 | Broder et al. |
| 2004/0243556 | A1 | 12/2004 | Ferrucci et al. |
| 2004/0249795 | A1 | 12/2004 | Brockway |
| 2005/0043936 | A1 | 2/2005 | Corston-Oliver et al. |
| 2005/0049852 | A1 * | 3/2005 | Chao ............. 704/9 |
| 2005/0065777 | A1 | 3/2005 | Dolan et al. |
| 2005/0071150 | A1 | 3/2005 | Nasypny |
| 2005/0108001 | A1 | 5/2005 | Aarskog |
| 2005/0108630 | A1 | 5/2005 | Wasson et al. |
| 2005/0182617 | A1 | 8/2005 | Reynar et al. |
| 2005/0182619 | A1 | 8/2005 | Azara |
| 2005/0216443 | A1 | 9/2005 | Morton et al. |
| 2005/0267871 | A1 | 12/2005 | Marchisio et al. |
| 2005/0283474 | A1 | 12/2005 | Francis et al. |
| 2006/0047632 | A1 | 3/2006 | Zhang |
| 2006/0116860 | A1 * | 6/2006 | Kaplan et al. ............. 704/1 |
| 2006/0156222 | A1 | 7/2006 | Chi |
| 2006/0161534 | A1 | 7/2006 | Carson, Jr. et al. |
| 2006/0184517 | A1 | 8/2006 | Anderson |
| 2006/0206307 | A1 * | 9/2006 | Sugihara et al. ............. 704/4 |
| 2006/0224582 | A1 | 10/2006 | Hogue |
| 2006/0271350 | A1 | 11/2006 | Chino et al. |
| 2006/0271353 | A1 | 11/2006 | Berkan et al. |
| 2006/0282414 | A1 | 12/2006 | Sugihara et al. |
| 2007/0033221 | A1 | 2/2007 | Copperman et al. |
| 2007/0073533 | A1 * | 3/2007 | Thione et al. ............. 704/9 |
| 2007/0073745 | A1 | 3/2007 | Scott |
| 2007/0106499 | A1 * | 5/2007 | Dahlgren et al. ............. 704/10 |
| 2007/0143098 | A1 | 6/2007 | Van Den Berg |
| 2007/0156393 | A1 | 7/2007 | Todhunter et al. |
| 2007/0179776 | A1 * | 8/2007 | Segond et al. ............. 704/9 |
| 2008/0033982 | A1 | 2/2008 | Parikh |
| 2008/0086498 | A1 | 4/2008 | Sureka |
| 2008/0120279 | A1 | 5/2008 | Xue |
| 2008/0172628 | A1 | 7/2008 | Mehrotra |
| 2009/0019038 | A1 | 1/2009 | Millett |
| 2009/0271179 | A1 | 10/2009 | Marchisio et al. |
| 2010/0106706 | A1 | 4/2010 | Rorex |

FOREIGN PATENT DOCUMENTS

| | | |
|---|---|---|
| EP | 0597630 | 5/1994 |
| EP | 1675025 | 6/2006 |
| JP | 02-068661 | 3/1990 |
| JP | 11-282844 A | 10/1999 |
| JP | 2006-330298 A | 12/2006 |
| JP | 2006-344102 | 12/2006 |
| KR | 10-0546743 | 4/2005 |
| WO | WO 02/067145 | 8/2002 |

OTHER PUBLICATIONS

International Search Report dated Mar. 26, 2009 in International Application No. PCT/US2008/074935.

Bontcheva et al., "Shallow Methods for Named Entity Coreference Resolution," Proceedings of the TALN 2002 Workshop. Nancy, France. Jun. 24-27, 2002, 9 pages.

Ng, Vincent "Shallow Semantics for Coreference Resolution," Proceedings of the Twentieth International Joint Conference on Artificial Intelligence (IJCAI), Hyderabad, India, Jan. 2007, pp. 1689-1694.

Chinese Official Action dated May 18, 2011 in Chinese Application No. 200880105563.

U.S. Official Action dated Jun. 22, 2011 in U.S. Appl. No. 12/201,596.

Duchier, Denys,"Constraint Programming for Natural Language Processing", retrieved at <<http://citeseerx.ist.psu.edu/viewdoc/downloadjsessionid=F70461C9F31A4EB405543CE688CCBF3D?-doi=10.1.1.10.3152&rep=repl&type=pdf, 2000. pp. 1-94.

"Powerset, Natural Language Search Engine", retrieved at <<http://googlesystem.blogspot.com/2007/02/powerset-natural-language-search-engine.html, Feb. 9, 2007. pp. 1-3.

Chien, Lee-Feng,"Fast and Quasi-Natural Language Search for Gigabytes of Chinese Texts", retrieved at <<http://delivery.acm.org/10.1145/220000/215345/p112-chien.pdf?key1=215345&key2=4667021221&coll=GUIDE&dl=GUIDE&CFID=2506110&CFTOKEN=93982745>>, 1995. pp. 1-9.

Kolodner Janet L.,"Indexing and Retrieval Strategies for Natural Language Fact Retrieval", retrieved z, retrieved at <<http://delivery.acm.org/10.1145/320000/319995/p434-kolodner.pdf?key1=319995&key2=1457021221&coll=GUIDE&dl=GUIDE&CFID=2551390&CFTOKEN=71366194>>, ACM Transactions on Database Systems, vol. 8, No. 3, Sep. 1983. pp. 1-31.

Thione, et al., "Applying Term Occurrence constraints in natural language search", U.S. Appl. No. 60/969,406, filed Aug. 31, 2007.

Walters, et al., "Flexible Ranking infrastructure for query execution", U.S. Appl. No. 60/969,410, filed Aug. 31, 2007.

Walters, et al., "Checkpointing of composite lazily-evaluated integrators in search", U.S. Appl. No. 60/969,417, filed Aug. 31, 2007.

Thione, et al., "Indexing of alias clusters for search", U.S. Appl. No. 60/969,426, filed Aug. 31, 2007.

Crouch, et al., "Aboutness identification and indexing", U.S. Appl. No. 60/969,434, filed Aug. 31, 2007.

Polanyi, et al., "Valence calculus for indexing with special reference to reported speech and thought", U.S. Appl. No. 60/969,442, filed Aug. 31, 2007.

(56) References Cited

OTHER PUBLICATIONS

Snow, et al., "Bucketized threshold for runtime pruning of senses/ranking", U.S. Appl. No. 60/969,447, filed Aug. 31, 2007.
Pell, et al., "Hierarchal probability-based weighting for hypernyms in word sense disambiguation", U.S. Appl. No. 60/969,451, filed Aug. 31, 2007.
Biewald, et al., "Priority-based ranking functions for information retrieval", U.S. Appl. No. 60969453, filed Aug. 31, 2007.
Pell, et al.,"Priority-based disjunctive retrieval", U.S. Appl. No. 60/969,457, filed Aug. 31, 2007.
Rayner, et al., "Semi-automatic example-based induction of semantic translation rules to support natural language search", U.S. Appl. No. 60/969,472, filed Aug. 31, 2007.
Thione, et al., "Semantically-based highlighting of search results", U.S. Appl. No. 60/969,478, filed Aug. 31, 2007.
Salvetti, et al., "Integration of conference resolution in an ambiguity-sensitive natural language processing pipeline for a search platform", U.S. Appl. No. 60/969,483, filed Aug. 31, 2007.
Thione, et al., "Fact-based indexing for natural language search", U.S. Appl. No. 60/969,486, filed Aug. 31, 2007.
Thione, et al., "Attribute-value mapping to map structural information about entities to ontologies", U.S. Appl. No. 60/969,488, file Aug. 31, 2007.
Thione, et al., "Indexing and ranking role hierarchies search index", U.S. Appl. No. 60/969,490, filed Aug. 31, 2007.
Thione, et al., "Efficient posting layout for retrieval of terms in dominance hierarchies", U.S. Appl. No. 60/969,495, filed Aug. 31, 2007.
Salvetti, et al., "A system for browsing knowledge on the basis of semantic relations", U.S. Appl. No. 60/971,061, filed Sep. 10, 2007.
International Search Report dated Apr. 29, 2009 in International Application No. PCT. No. PCT/US08/074981.
U.S. Official Action dated Jan. 3, 2011 in U.S. Appl. No. 12/201,596.
Jun et al., "Keyfact-Based Information Retrieval System", TaeJon, Korea, downloaded Mar. 18, 2011 from http://www.dl.slis.tsukuba.ac.jp/ISDL97/proceedings/miseon/miseon.html, 6 pages.
Tablan et al., "A Natural Language Query Interface to Structured Information", downloaded Mar. 18, 2011 from http://www.eswc2008.org/final-pdfs-for-web-site/onl-2.pdf, 15 pages.
International Search Report dated Mar. 31, 2009 in International Application No. PCT/US08/074938.
International Search Report dated Jan. 23, 2009 in International Application No. PCT/US08/074978.
International Search Report dated Mar. 31, 2009 in International Application No. PCT/US08/074984.
International Search Report dated Mar. 31, 2009 in International Application No. PCT/US08/074987.
European Search Report dated Oct. 5, 2011 in European Application No. 08799054.5.
U.S. Official Action dated Mar. 17, 2011 U.S. Appl. No. 12/201,504.
U.S. Official Action dated Oct. 12, 2011 in U.S. Appl. No. 12/201,504.
U.S. Official Action dated Jan. 25, 2011 in U.S. Appl. No. 12/201,675.
U.S. Official Action dated Apr. 14, 2011 in U.S. Appl. No. 12/201,675.
U.S. Official Action dated Oct. 3, 2011 in U.S. Appl. No. 12/201,675.
U.S. Official Action dated Mar. 15, 2011 in U.S. Appl. No. 12/201,721.
U.S. Official Action dated Oct. 26, 2011 in U.S. Appl. No. 12/201,721.
U.S. Official Action dated Dec. 23, 2010 in U.S. Appl. No. 12/201,978.
U.S. Official Action dated Jun. 7, 2011 in U.S. Appl. No. 12/201,978.
Agichtein, et al., "Snowball: Extracting Relations from Large Plain-Text Collections," Dec. 1999, Columbia University Computer Science Dept. Technical Report CUCS-033-99, 13 pp.
Alesso, "Semantic Search Methods," downloaded Aug. 28, 2008 from http://microsoft.apress.com/asptodayarchivel73985/semantic-search-methods, 14 pages.
Araghi, "Users Satisfaction through Better Indexing," 2005, *Cataloging & Classification Quarterly*, 40(2): 5-12. 9 pp.
CS474 Intro to Natural Language Processing: Question Answering, downloaded Dec. 12, 2011 from http://www.cs.cornell.edu/courses/cs474/2005fa/Handouts/advanced-qa.pdf, 8 pgs.
Debrauwer et al., "Semantic Searching and Text Analysis with Distinguo®," downloaded Dec. 12, 2011 from http://www.ultralingua.com/ul/en/dox/Distinguo-White-Paper.pdf, 6 pp.
Hakia—Meaning-based Search Engine for a Better Search, downloaded Aug. 28, 2008 from http://www.techiequest.com/hakia-meaning-based-search-engine-for-a-better-search/, 8 pgs.
Han et al, "A Study on the Conceptual Modeling and Implementation of a Semantic Search System," Mar. 2008, *Korea Intelligent Information Systems Society*, 14(1): 67-84.
Huibers, "Towards an Axiomatic Aboutness Theory for Information Retrieval," 1998, Information Retrieval: Uncertainty and Logics—Advanced Models for the Representation and Retrieval of Information. Kluwer Academic Publishers, 7 pp.
Hussam et al., "Semantic Highlighting on the WWW: Educational Implications," Nov. 1998, *Proceedings of the WebNet 98 World Conference on the WWW, Internet and Intranet*, 6 pp.
Hutchins, "On the problem of 'Aboutness' in Document Analysis," Apr. 1977, *Journal of Informatics*, 1(1): 17-35. 16 pp.
Kang et al., "Document Indexing: A Concept-Based Approach to Term Weight Estimation," 2005, *Information Processing and Management*, 41:1065-1080, 16 pp.
Kapoor et al., "STAR: A System for Tuple and Attribute Ranking of Query Answer" Apr. 15, 2007, *International Conference on Data Engineering 2007*, 2 pp.
Lo et al., "Using Semantic Relations with World Knowledge for Question Answering," 2006, *Proceedings of the 15th Text Retrieval Conference (TREC 15)*, 6 pp.
Manegold et al., A multi-query optimizer for Monet, Jan. 31, 2000, Information Systems, 18 pp.
Moens et al., "Measuring Aboutness of an Entity in a Text," 2006, *Proceedings of the 1st Workshop on Graph Based Methods for Natural Language Processing*, 4 pp.
Seki, Y., "Answer Extraction System by Question Type from Query Biased Summary for Newspaper Articles," Sep. 2001-Oct. 2002, *Proceedings of the 3rd NTCIR Workshop*, 8 pp.
Sieg et al., "Learning Ontology-based User Profiles: A Semantic Approach to Personalized Web Search," Nov. 2007, *IEEE Intelligent Informatics Bulletin*, 8(1): 7-18, 12 pp.
Smeaton et al., "Experiments on Using Semantic Distances between Words in Images Caption Retrieval," Aug. 1996, *Proceedings of the 19th Annual International ACM SIGIR Conference on Research and Development in Information Retrieval*, 8 pp.
Srihari et al., "Information Extraction Supported Question Answering," Oct. 15, 1999, downloaded from http://handle.dtic.mil/100.2/ADA460042, 12 pp.
Taibi et al., "A Semantic Search Engine for Learning Resources," 2005, *Recent Research Developments in Learning Technologies*, http://www.formatex.org/micte2005/349.pdf, 5 pp.
Vintar et al., "Semantic Relations in Concept-Based Cross-Language Medical Information Retrieval," Sep. 22, 2003, *Proceedings of the ECML / PKDD Workshop on Adaptive Text Extraction and Mining*, 9 pp.
Japanese Official Action dated Nov. 28, 2012 in Japanese Application No. 2010-523185.
Chinese Official Action dated Apr. 13, 2012 in Chinese Application No. 200880105563.X.
U.S. Notice of Allowance dated Apr. 5, 2012 in U.S. Appl. No. 12/201,504.
U.S. Notice of Allowance dated Apr. 14, 2012 in U.S. Appl. No. 12/201,721.
U.S. Official Action dated Jan. 4, 2012 in U.S. Appl. No. 12/201,978.
Australian Official Action dated May 22, 2012 in Australian Application No. 2008292779.

(56) References Cited

OTHER PUBLICATIONS

Australian Official Action dated Jul. 10, 2012 in Australian Application No. 2008292779.
Russian Notice of Allowance dated Nov. 13, 2012 in Russian Application No. 2010107148.
Russian Patent No. 2096824, published Nov. 11, 1997, in the name of GNTTS GIPERINFORMATSIONNYKH, Abstract only.

U.S. Official Action dated Aug. 8, 2012 in U.S. Appl. No. 12/201,978.
U.S. Notice of Allowance dated Sep. 20, 2013 in U.S. Appl. No. 12/201,596.
Japanese Official Action dated Aug. 16, 2013 in Japanese Application No. 2010/523185.
Israeli Official Action dated May 8, 2013 in Israeli Application No. 204107.

* cited by examiner

COREFERENCE RESOLUTION IN AN AMBIGUITY-SENSITIVE NATURAL LANGUAGE PROCESSING SYSTEM

CROSS-REFERENCE TO RELATED APPLICATIONS

This application claims the benefit of U.S. provisional patent application No. 60/969,426, filed on Aug. 31, 2007, entitled "Indexing of Alias Clusters for Search;" U.S. provisional patent application No. 60/969,483, filed on Aug. 31, 2007, entitled "Integration of Coreference Resolution in an Ambiguity-Sensitive Natural Language Processing Pipeline for a Search Platform;" and U.S. provisional patent application No. 60/969,486, filed on Aug. 31, 2007, entitled "Fact-Based Indexing for Natural Language Search," all three of which are expressly incorporated herein by reference in their entireties.

BACKGROUND

In natural language, it is not uncommon to refer to entities by different descriptions. For example, pronouns are commonly used to take the place of nouns. Also, various other descriptions, or different forms of a reference, may be used to refer to an entity. Considering the following portions of text as an example:

"Pablo Picasso was born in Malaga."
"The Spanish painter became famous for his varied styles."
"Among his paintings is the large-scale Guernica."
"He painted this disturbing masterpiece during the Spanish Civil War."
"Picasso died in 1973."

A range of linguistic variation is encountered. For example, two different names are used, "Pablo Picasso" and "Picasso." A definite description, "the Spanish painter," and two pronouns "his" and "he" are all used to refer to Picasso. Two different expressions are used to refer to a painting: the name of the piece, "Guernica" and a demonstrative description, "this disturbing masterpiece."

Two linguistic expressions may be said to be coreferential if they have the same referent. In other words, if they refer to the same entity. A second phrase can be an anaphor which is anaphoric to a first phrase. As such, the first phrase is the antecedent of the second phrase. Knowledge of the referent of the antecedent may be necessary to determine the referent of the anaphor. The general task of finding coreferential expressions, anaphors, and their antecedents within a document can be referred to as coreference resolution. Coreference resolution is the process of establishing that two expressions refer to the same referent, without necessarily establishing what that referent is. Reference resolution is the process of establishing what the referent is.

For clusters of expressions that are coreferential, irrespective of their anaphoric relationships, the expressions can be referred to as aliases of one another other. According to the example above, the expressions "Pablo Picasso," "the Spanish painter," "his," "he," and "Picasso" form an alias cluster referring to Picasso.

Natural language expressions often display ambiguity. Ambiguity occurs when an expression can be interpreted with more then one meaning. For example, the sentence "The duck is ready to eat" can be interpreted as asserting either that the duck is properly cooked or that the duck is hungry and needs to be fed.

Coreference resolution and ambiguity resolution are two examples of natural language processing operations that can be used to mechanically support language as commonly expressed by human users. Information processing systems, such as text indexing and querying in support of information searching, may benefit from increased application of natural language processing systems.

It is with respect to these considerations and others that the disclosure made herein is presented.

SUMMARY

Technologies are described herein for coreference resolution in an ambiguity-sensitive natural language processing system. In particular, techniques for integrating coreference resolution functionality into a system for processing documents to be indexed into an information search and retrieval system are described. This integration can enhance indexing with information supporting coreference resolution, and ambiguous meaning, within natural language documents.

According to one aspect presented herein, information provided by a coreference resolution system can be integrated into, and improve the performance of, a natural language processing system. An example of such a system is a document indexing and retrieval system.

According to another aspect presented herein, ambiguity awareness features, as well as ambiguity resolution functionality, can operate in coordination with coreference resolution within a natural language processing system. Annotation of coreference entities, as well as ambiguous interpretations, can be supported by in-line markup within text expressions or alternatively by external entity maps.

According to yet another aspect presented herein, facts can be extracted from text to be indexed. Information expressed within the text can be formally organized in terms of facts. Used in this sense, a fact can be any information contained in the text, and need not necessarily be true. A fact may be represented as a relationship between entities. A fact can be stored in a semantic index as a relationship between entities stored within the index. In a fact-based retrieval system, a document can be retrieved if it contains a fact that matches a fact determined through analysis of the query According to yet another aspect presented herein, a process of expansion can support applying multiple aliases, or ambiguities, to an entity being indexed. Such expansion can support additional possible references, or interpretations, for a given entity being captured into the semantic index. Alternative stored descriptions can support retrieval of a fact by either the original description or a coreferential description.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for coreference resolution in an ambiguity-sensitive natural language processing system. Through the use of the technologies and concepts presented herein, coreference resolution functionality can be integrated into a natural language processing system that processes documents to be indexed for use in an information search and retrieval system. This integration can enhance the index with information supporting coreference resolution for natural language documents being indexed.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for coreference resolution in an ambiguity-sensitive natural language processing system are described.

Figure 1:
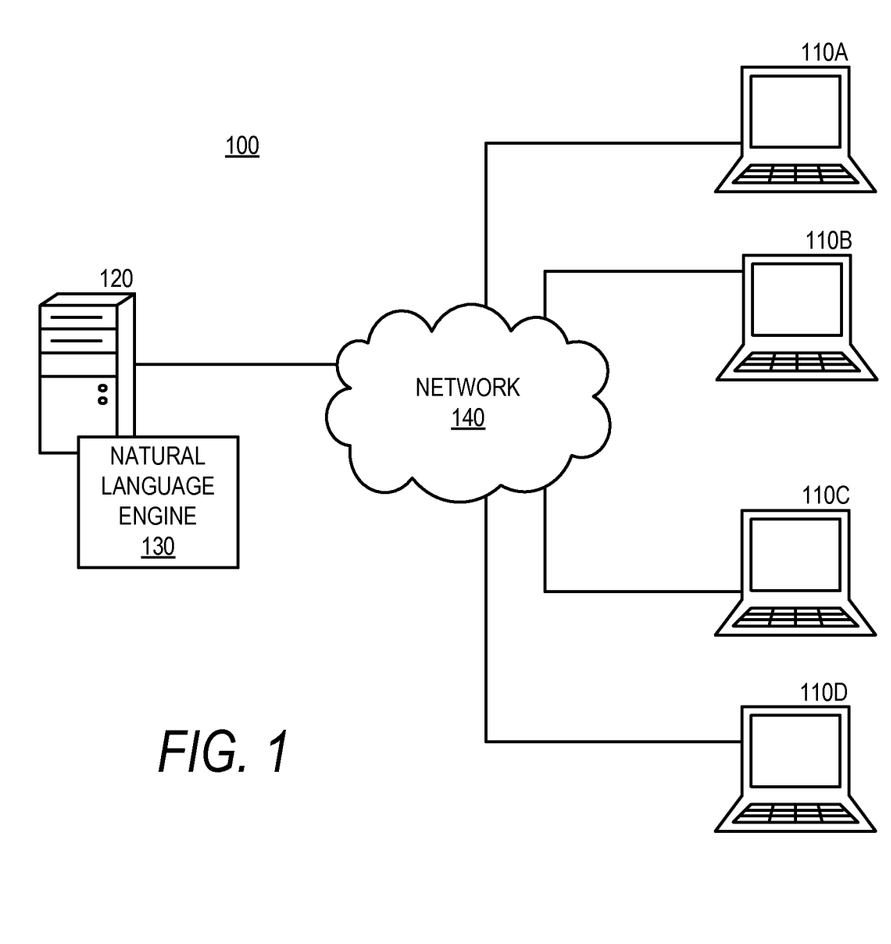
FIG. 1 is a network architecture diagram illustrating an information search system according to aspects of an embodiment presented herein.

Turning now to FIG. 1, details will be provided regarding an illustrative operating environment for the implementations presented herein. In particular, a network architecture diagram 100 illustrates an information search system according to aspects of an embodiment presented herein. Client computers 110A-110D can interface through a network 140 to a server 120 to obtain information associated with a natural language engine 130. While four client computers 110A-110D are illustrated, it should be appreciated that any number of client computers 110A-110D may be in use. The client computers 110A-110D may be geographically distributed across a network 140, collocated, or any combination thereof. While a single server 120 is illustrated, it should be appreciated that the functionality of the server 120 may be distributed over any number of multiple servers 120. Such multiple servers 120 may be collocated, geographically distributed across a network 140, or any combination thereof.

According to one or more embodiments, the natural language engine 130 may support search engine functionality. In a search engine scenario, a user query may be issued from a client computer 110A-110D through the network 140 and on to the server 120. The user query may be in a natural language format. At the server, the natural language engine 130 may process the natural language query to support a search based upon syntax and semantics extracted from the natural language query. Results of such a search may be provided from the server 120 through the network 140 back to the client computers 110A-110D.

One or more search indexes may be stored at, or in association with, the server 120. Information in a search index may be populated from a set of source information, or a corpus. For example, in a web search implementation, content may be collected and indexed from various web sites on various web servers (not illustrated) across the network 140. Such collection and indexing may be performed by software executing on the server 120, or on another computer (not illustrated). The collection may be performed by web crawlers or spider applications. The natural language engine 130 may be applied to the collected information such that natural language content collected from the corpus may be indexed based on syntax and semantics extracted by the natural language engine 130. Indexing and searching is discussed in further detail with respect to FIG. 2.

The client computers 110A-110D may act as terminal clients, hypertext browser clients, graphical display clients, or other networked clients to the server 120. For example, a web browser application at the client computers 110A-110D may support interfacing with a web server application at the server 120. Such a browser may use controls, plug-ins, or applets to support interfacing to the server 120. The client computers 110A-110D can also use other customized programs, applications, or modules to interface with the server 120. The client computers 110A-110D can be desktop computers, laptops, handhelds, mobile terminals, mobile telephones, television set-top boxes, kiosks, servers, terminals, thin-clients, or any other computerized devices.

The network 140 may be any communications network capable of supporting communications between the client computers 110A-110D and the server 120. The network 140 may be wired, wireless, optical, radio, packet switched, circuit switched, or any combination thereof. The network 140 may use any topology, and links of the network 140 may support any networking technology, protocol, or bandwidth such as Ethernet, DSL, cable modem, ATM, SONET, MPLS, PSTN, POTS modem, PONS, HFC, satellite, ISDN, WiFi, WiMax, mobile cellular, any combination thereof, or any other data interconnection or networking mechanism. The network 140 may be an intranet, an internet, the Internet, the World Wide Web, a LAN, a WAN, a MAN, or any other network for interconnection computers systems.

It should be appreciated that, in addition to the illustrated network environment, the natural language engine 130 can be operated locally. For example, a server 120 and a client computer 110A-110D may be combined onto a single computing device. Such a combined system can support search indexes stored locally or remotely.

Figure 2:
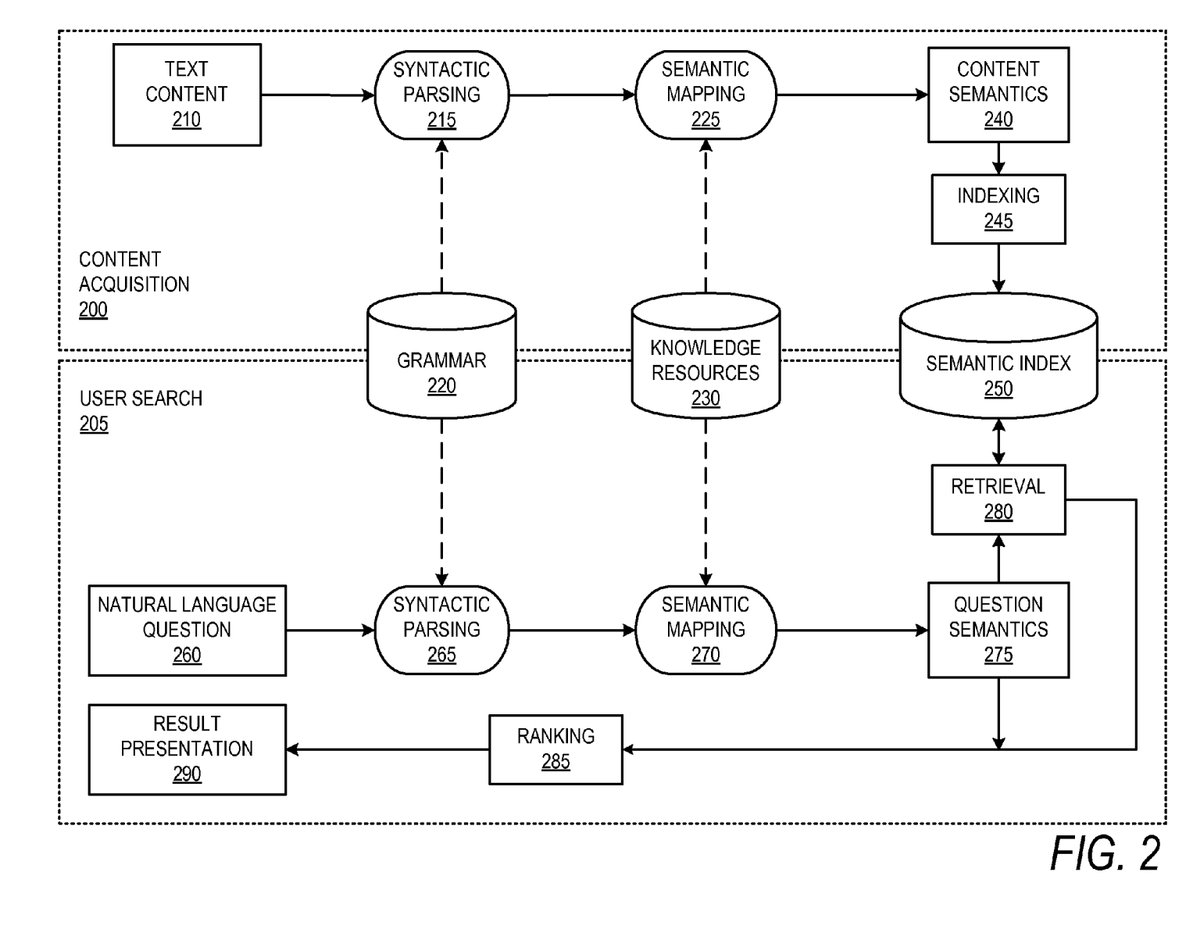
FIG. 2 is a functional block diagram illustrating various components of a natural language index and query system according to aspects of an embodiment presented herein.

Referring now to FIG. 2, a functional block diagram illustrates various components of a natural language engine 130 according to one exemplary embodiment. As discussed above, the natural language engine 130 can support information searches. In order to support such searches, a content acquisition process 200 is performed. Operations related to content acquisition 200 extract information from documents provided as text content 210. This information can be stored in a semantic index 250 that can be used for searching. Operations related to a user search 205 can support processing of a user entered search query. The user query can take the form of a natural language question 260. The natural language engine 130 can analyze the user input to translate a query into a representation to be compared with information represented within the semantic index 250. The content and structuring of information in the semantic index 250 can support rapid matching and retrieval of documents, or portions of documents, that are relevant to the meaning of the query or natural language question 260.

The text content 210 may comprise documents in a very general sense. Examples of such documents can include web pages, textual documents, scanned documents, databases, information listings, other Internet content, or any other information source. This text content 210 can provide a corpus of information to be searched. Processing the text content 210 can occur in two stages as syntactic parsing 215 and semantic mapping 225. Preliminary language processing steps may occur before, or at the beginning of parsing 215. For example, the text content 210 may be separated at sentence boundaries. Proper nouns may be identified as the names of particular people, places, objects or events. Also, the grammatical properties of meaningful word endings may be determined. For example, in English, a noun ending in "s" is likely to be a plural noun, while a verb ending in "s" may be a third person singular verb.

Parsing 215 may be performed by a syntactic analysis system, such as the Xerox Linguistic Environment (XLE), provided here only as a general example, but not to limit possible implementations of this description. The parser 215 can convert sentences to representations that make explicit the syntactic relations among words. The parser 215 can apply a grammar 220 associated with the specific language in use. For example, the parser 215 can apply a grammar 220 for English. The grammar 220 may be formalized, for example, as a lexical functional grammar (LFG) or other suitable parsing mechanism such as those based on Head-Driven Phrase Structure Grammar (HPSG), Combinatory Categorial Grammar (CCG), Probabilistic Context-free Grammar (PCFG) or any other grammar formalism. The grammar 220 can specify possible ways for constructing meaningful sentences in a given language. The parser 215 may apply the rules of the grammar 220 to the strings of the text content 210.

A grammar 220 may be provided for various languages. For example, LFG grammars have been created for English, French, German, Chinese, and Japanese. Other grammars may be provided as well. A grammar 220 may be developed by manual acquisition where grammatical rules are defined by a linguist or dictionary writer. Alternatively, machine learning acquisition can involve the automated observation and analysis of many examples of text from a large corpus to automatically determine grammatical rules. A combination of manual definition and machine learning may be also be used in acquiring the rules of a grammar 220.

The parser 215 can apply the grammar 220 to the text content 210 to determine the syntactic structure. In the case of LFG based parsing, the syntactic structures consist of constituent structures (c-structures) and functional structures (f-structures). The c-structure can represent a hierarchy of constituent phrases and words. The f-structure can encode roles and relationships between the various constituents of the c-structure. The f-structure can also represent information derived from the forms of the words. For example, the plurality of a noun or the tense of a verb may be specified in the f-structure.

During a semantic mapping process 225 that follows the parsing process 215, information can be extracted from the syntactic-structures and combined with information about the meanings of the words in the sentence. A semantic map or semantic representation of a sentence can be provided as content semantics 240. Semantic mapping 225 can augment the syntactic relationships provided by the parser 215 with conceptual properties of individual words. The results can be transformed into representations of the meaning of sentences from the text content 210. Semantic mapping 225 can determine roles played by words in a sentence. For example, the subject performing an action, something used to carry out the action, or something being affected by the action. For the purposes of search indexing, words can be stored in a semantic index 250 along with their roles. Thus, retrieval from the semantic index 250 can depend not merely on a word in isolation, but also on the meaning of the word in the sentences in which it appears within the text content 210. Semantic mapping 225 can support disambiguation of terms, determination of antecedent relationships, and expansion of terms by synonym, hypernym, or hyponym.

Semantic mapping 225 can apply knowledge resources 230 as rules and techniques for extracting semantics from sentences. The knowledge resources can be acquired through both manual definition and machine learning, as discussed with respect to acquisition of grammars 220. The semantic mapping 225 process can provide content semantics 240 in a semantic extensible markup language (semantic XML or semxml) representation. Any suitable representation language, such as expressions written in the PROLOG, LISP, JSON, YAML, or others may also be used. Content semantics 240 can specify roles played by words in the sentences of the text content 210. The content semantics 240 can be provided to an indexing process 245.

An index can support representing a large corpus of information so that the locations of words and phrases can be rapidly identified within the index. A traditional search engine may use keywords as search terms such that the index maps from keywords specified by a user to articles or documents where those keywords appear. The semantic index 250 can represent the semantic meanings of words in addition to the words themselves. Semantic relationships can be assigned to words during both content acquisition 200 and user search 205. Queries against the semantic index 250 can be based on not only words, but words in specific roles. The roles are those played by the word in the sentence or phrase as stored in the semantic index 250. The semantic index 250 can be considered an inverted index that is a rapidly searchable database whose entries are semantic words (i.e. word in a given role) with pointers to the documents, or web pages, on which those words occur. The semantic index 250 can support hybrid indexing. Such hybrid indexing can combine features and functions of both keyword indexing and semantic indexing.

User entry of queries can be supported in the form of natural language questions 260. The query can be analyzed through a natural language pipeline similar, or identical, to that used in content acquisition 200. That is, the natural language question 260 can be processed by a parser 265 to extract syntactic structure. Following syntactic parsing 265, the natural language question 260 can be processed for semantic mapping 270. The semantic mapping 270 can provide question semantics 275 to be used in a retrieval process 280 against the semantic index 250 as discussed above. The retrieval process 280 can support hybrid index queries where both keyword index retrieval and semantic index retrieval may be provided alone or in combination.

In response to a user query, results of retrieval 280 from the semantic index 250 along with the question semantics 275 can inform a ranking process 285. Ranking can leverage both keyword and semantic information. During ranking 285, the results obtained by retrieval 280 can be ordered by various metrics in an attempt to place the most desirable results closer to the top of the retrieved information to be provided to the user as a result presentation 290.

Figure 3:
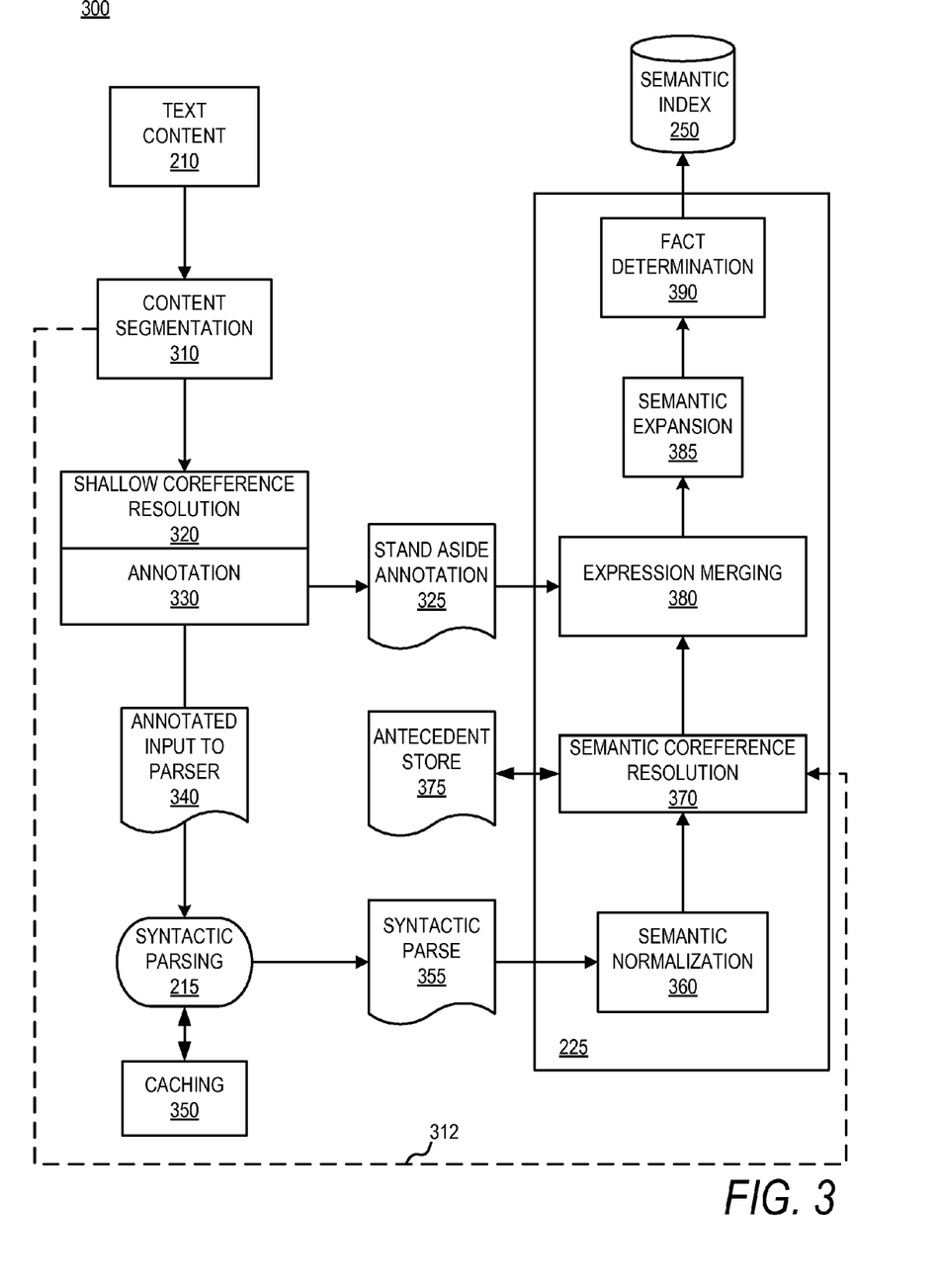
FIG. 3 is a functional block diagram illustrating coreference resolution and ambiguity resolution within a natural language processing system according to aspects of an embodiment presented herein.

Turning now to FIG. 3, a functional block diagram illustrates coreference resolution and ambiguity resolution within a natural language processing system 300 according to aspects of an embodiment presented herein. As an example application, the natural language processing system 300 can support an information search engine for document indexing and retrieval. Such a natural language enabled search engine can expand the information stored within its index based upon linguistic analysis. The system may also support discovery of the intention within a user query by analyzing the query linguistically. The coreference resolution and ambiguity resolution features discussed here can operate in relation to the syntactic parsing 215, semantic mapping 225, and semantic indexing 245 as discussed with respect to FIG. 2. Coreference resolution can be performed directly on the Text Content 210, or use information from parsing 215 or semantic mapping 225 operations.

As illustrated, coreference resolution 320, 370 may be performed directly on a segmented document and also as part of semantic mapping 225. These two occurrences of coreference resolution 320, 370 may be merged or their information outputs may be merged. It should be appreciated that coreference resolution may also occur between syntactic parsing 215 and semantic mapping 225. Coreference resolution may also occur at any other stage within a natural language processing pipeline. There may be one, two, or more coreference resolution components, or stages, at various positions within the natural language processing system. Text content 210 can be analyzed for information to store into a semantic index 250. Searching can involve querying the semantic index 250 for desired information.

Content segmentation 310 can be performed on documents making up the text content 210. The documents can be segmented for more efficient and potentially more accurate coreference resolution 320. Coreference resolution 320 can consider potential reference relationships across an entire document. For long documents, a great deal of time can be spent comparing distant expressions. When speed of processing is considered, content segmentation 310 of documents prior to coreference resolution 320 can substantially reduce the time used for processing. Content segmentation 310 can effectively reduce the amount of content text 210 that is explored in attempts at coreference resolution 320.

Content segmentation 310 can provide information to semantic coreference resolution 370 to indicate when a new document segment begins. Such information may be provided as a segmentation signal 312 or by inserting mark-up into a content document segment. An external file containing meta-information or other mechanisms may be also be used.

The structure of a document may be used to identify segment boundaries that reference relations are unlikely to cross. Document structure can be inferred either from explicit markup such as paragraph boundaries, chapters, or section headings. Document structure can also be discovered through linguistic processing. Segments that exceed a specified length may be further subdivided. The desired subdivision length may be expressed, for example, in terms of a number of sentences or a number of words.

Where reliable document structuring is not available, heuristic or statistical criteria may be applied. Such criteria may be specified as to tend to keep coreferences together while limiting the size of a segment to a predetermined maximum. Various other approaches for segmenting text content 210 documents may also be applied. Content segmentation 310 may also specify an entire document as one segment.

Coreference resolution 320, 370 can be used to identify coreference and aliases within the content text 210. For example, when indexing the sentence "He painted Guernica," it can be crucial to determine that "he" refers to Picasso. This is particularly so if fact-based retrieval is in use. Resolving the pronoun alias for Picasso can support indexing the fact that Picasso painted Guernica, rather than the less useful fact that some male individual "he" painted Guernica. Without this ability to identify and index the referent of the pronoun, it can be difficult, using a fact-based retrieval method, to retrieve the document in response to the query "Picasso painted." The recall of the system can be improved when a document relevant to the query is returned that may not have otherwise been returned.

Annotation 330 may be applied to text content 210 to support tracking entities and possible coreference relationships. Confidence values in resolution decisions may also be annotated or marked up within the text content 210. The resolution determinations can be recorded by adding explicit annotation marks to the text. For example, given the text, "John visited Mary. He met her in 2003." An annotation 330 may be applied as, "[E1:0.9 John] visited [E2:0.8 Mary]. [E1:0.9 He] met [E2:0.8 her] in 2003." Where the words "John" and "He" may be related as entity one E1 with a confidence value of 0.9. Similarly, the words "Mary" and "her" may be related as entity two E2 with a confidence value of 0.8. The confidence value can indicate a measure of the confidence in the coreference resolution 320 decision. Annotation can encode coreference decisions directly, or annotation can function as identifiers connecting relevant terms in the annotated text to additional information in stand aside annotation 325.

Coreference resolution 320 decisions may be used as part of the process of constructing semantic mapping 225. Referring expressions used by the coreference resolution 320 system may be integrated into the input representation for the semantic mapping 225 by inline annotations within the text content 210. The references may also be provided separately in an external stand-aside entity map 325.

Within a large document collection of text content 210, such as the World Wide Web, the same sentence may appear multiple times in different contexts. These different contexts may provide different candidates for coreference resolution 320. Since syntactic parsing 215 can be computationally expensive, it may be useful to save parsing results for sentences in a cache. Such a caching mechanism 350 can support rapidly retrieving parse information when a sentence is encountered in the future.

If coreference resolution 320 is applied to a single sentence appearing in different contexts, it may identify different coreference relationships for the same referring expressions since coreference may be dependent on context. Thus, different entity identifiers may be inserted inline to the text. For instance, the text "He is smart" appearing in two different documents may be annotated with two different identifiers, "[E21 He] is smart." and "[E78 He] is smart." Where the word "He" in a first document refers to a different person that the word "He" in a second document.

There may be different sources of information for shallow coreference resolution 320. For example, in addition to the expression detection performed during coreference resolution 320, there may be a system dedicated to finding proper names in the text content 210. These different sources may identify conflicting resolution information. For example, a conflicting resolution may occur where boundaries cross. For instance, two systems might have identified the following conflicting referring expressions:

"[John] told [George Washington] [Irving] was a great writer."

"[John] told [George] [Washington Irving] was a great writer."

Consider the following conflicts of crossed boundaries: [George Washington] in the first string conflicts with [George] in the second string. Also [George Washington] in first string conflicts with [Washington Irving] in the second string. Based on confidence information or contextual factors, different strategies may be applied iteratively to resolve this conflict or to preserve it. In a "drop" strategy, two or more conflicting boundaries may be resolved by dropping the one with lowest confidence. In a "merge" strategy, the boundaries may be moved accordingly when two or more boundaries are equally plausible in compatible contexts. For example, "[Mr. John] Smith" and "Mr. [John Smith]" can merge to provide "[Mr. John Smith]." In a "preserve" strategy, multiple boundaries can be preserved by maintaining them as ambiguous output when the configuration of the boundaries and their confidence values support neither merger nor drop. For example, "[Alexander the Great]" and "[Alexander][the Great]" could be provided as alternative ambiguous resolutions.

The parsing component 215 can be an ambiguity aware parser support direct parsing of the ambiguous input where the syntactic parse 355 can preserve ambiguity. Alternatively, ambiguous input resolutions may need to be parsed separately, and multiple output structures may be passed to the semantic component 225 separately. Semantic processing 225, as discussed in further detail below, may be applied multiple times to each output of the syntactic parser 215. This may result in different semantic outputs for different syntactic inputs. Alternatively, semantic mapping 225 can combine the various inputs and process them in unison.

Semantic mapping 225 can being with semantic normalization 360. Multiple ambiguous the syntactic parse 355 outputs of a sentence may share meaning while having different forms. For example, this may be occur in the normalization of passive language. Considering, "John gave Mary a present," the word "John" is the subject and "Mary" is the indirect object. Considering, "a present was given to Mary by John," the subject is "Mary" and "John" is an object. Normalization 360 can provide outputs where these two examples and represented the same as "John" being the semantic-subject and "Mary" being semantic-indirect-object. Alternatively, "John" may be identified as an agent, and "Mary" as a recipient. Similarly, identical representations may be provided for "Rome's destruction of Carthage" and "Rome destroyed Carthage."

Semantic normalization may also add information about the different words of the parsed sentence. For example, the words may be identified in a lexicon and associated with their synonyms, hypernyms, possible aliases, and other lexical information.

Semantics based coreference resolution 370 may resolve expressions based upon syntactic and semantic information. For example, "John saw Bill. He greeted him." may resolve "he" to "John" and "him" to "Bill." This resolution may be assigned since "he" and "John" are both subjects, while "him" and "Bill" are both objects.

Shallow coreference resolution 320 may function by inspecting a document segment where terms occur. In contrast, semantic coreference resolution 370, or deep coreference resolution may process one sentence at a time. Possible antecedents of sentences may be placed into an antecedent store 375 so that semantic coreference resolution 370 of later sentences may access earlier introduced elements. Antecedents may be stored with information about their grammatical function and roles in the sentence, their distance in the text, information about their relationships with other antecedents, and various other pieces of information.

Expression merging 380 can combine expressions from shallow coreference resolution 320, stand aside annotation 325, and information from semantic coreference resolution 370. Information for terms to be combined may be identified using string alignment or annotations 330. Other mechanisms for combining two annotations on the same text may also be used.

Syntactic parsing 215 can be a natural point of integration for the optionally detected referring expressions. A parser can support inferring structure in sentences such as constituents, or grammatical relationships such as subject and object. An ambiguity-enabled syntactic parser 215 can identify multiple alternative structural representations of a sentence. In one example, information from coreference resolution 320 can be used to filter the output of the syntactic parser 215 by retaining only those representations in which the left boundary of each referring expression coincides with the beginning of a compatible part from the parse. For example, coreference resolution may establish coreferents as in, "[E0 John] told [E1 George] [E2 Washington Irving] was a great writer." The syntactic parser 215 may separately provide four parsing possibilities:

1. [John] and [George] and [Washington Irving]
2. [John] and [George] and [Washington] and [Irving]
3. [John] and [George Washington] and [Irving]
4. [John] and [George Washington Irving]

parser possibilities number three and four may be filtered out because of incompatibility with the left boundary of the entity E2 "Washington Irving" as provided by reference resolution 320.

A process of expansion 385 can add additional information to a representation. For example, for "John sold a car to Bill," expansion 385 may additionally output the representation for "Bill bought a car from John." Similarly, for "John killed Bill," expansion 385 may additionally output the representation for "Bill died."

Traditional search engines may retrieve documents in response to user queries based upon matching keywords or terms. Documents may be ranked, in these traditional systems, according to factors such as how many of the terms from the query occur within the documents, how often the terms occur, or how close together the terms occur.

Considering the example query, "Picasso painted" with a first example document containing, "Picasso was born in Malaga. He painted Guernica." along with a second example document containing "Picasso's friend Matisse painted prolifically." All else being equal, a traditional system can rank the second document higher than the first document because the words "Picasso" and "painted" are closer together in the second document. In contrast, a system capable of resolving that the word "He" in the first document refers to Picasso may correctly rank the first document higher based on this knowledge. Assuming that the query "Picasso painted" reflects an intention of the user to find out what Picasso painted, the first document is clearly a more relevant result.

The natural language processing system 300 can have different architectures. In one embodiment, a pipeline may be provided where the information from one stage of language processing is passed as input to later stages. It should be appreciated that these approaches may be implemented with any other architecture operable to extracting the facts, to be indexed, from natural language text content 210.

Figure 4:
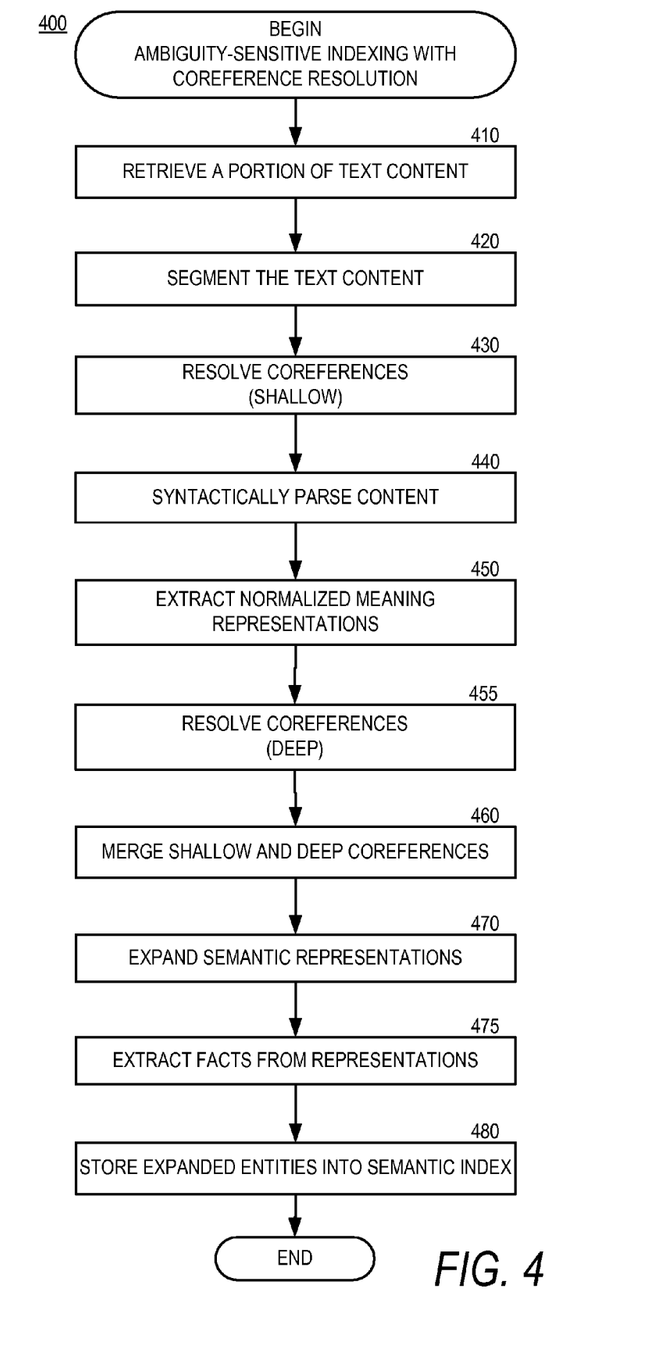
FIG. 4 is a logical flow diagram illustrating aspects of processes for ambiguity-sensitive indexing with coreference resolution according to aspects of an embodiment presented herein.

Referring now to FIG. 4, additional details will be provided regarding the embodiments presented herein for coreference resolution in an ambiguity-sensitive natural language processing system. In particular, FIG. 4 is a flow diagram illustrating aspects of processes 400 for ambiguity-sensitive indexing with coreference resolution according to aspects of an embodiment presented herein.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

The routine 400 begins at operation 410, where a portion of the text content 210 can be retrieved for analysis and indexing. At operation 420 the text content 210 can be segmented to bound the areas of text over which resolution processing much search and analyze. The segmentation may be based on structure within the text, such as sentences, paragraphs, pages, chapters, or sections. The segmentation may also be based on numbers of words, number of sentences, or other metrics of space or complexity.

At operation 430 coreferences can be resolved within the text content 210. Working with the boundaries established within operation 430, coreferences may be identified and matched. Alias clusters may be established. Surface structure may be used to provide "shallow" resolution. Ambiguities that arise during coreference resolution may be annotated. Such annotation 340 may be provided as mark-up within the text content 210 or through the use of an external entity map. Similar annotation may also be used to label the references and referents with entity numbers. Annotation may also be provided to indicate confidence levels of the established coreference resolutions.

At operation 440, syntactic parsing may convert sentences to representations that make explicit the syntactic relations among words. A parser 215 can apply a grammar 220 associated with the specific language to provide syntactic parse 355 information.

At operation 450, semantic representations can be extracted from the text content 210. Information expressed in document within the text content 210 may be formally organized in terms of representations of relationships between entities within the text. These relationships may be referred to as facts in a general sense.

At operation 455, syntactic parse 355 information output from a syntactic parse 215 may be used to support deep coreference resolution 370. Semantic representations produced during operation 450 may also be leveraged.

At operation 460, expressions from the shallow coreference resolution operation 430 may be integrated with information from the deep coreference resolution operation 455. An ambiguity-enabled syntactic parser 215 can identify multiple alternative structural representations of a sentence. Information from coreference resolution can be used to filter output of the syntactic parser 215.

At operation 470, the semantics of the text content 210 can be expanded to include chosen implied representations. At operation 475, facts can be extracted from the semantic representations expressing relationships between entities, events and states of affairs within the content text. At operation 480, the facts and entities may be stored into the semantic index 250.

The routine 400 can terminate after operation 480. However, it should be appreciated that the routine 400 may be applied repeatedly or continuously to retrieve text content 210 potions to be applied to the semantic index 250.

Figure 5:
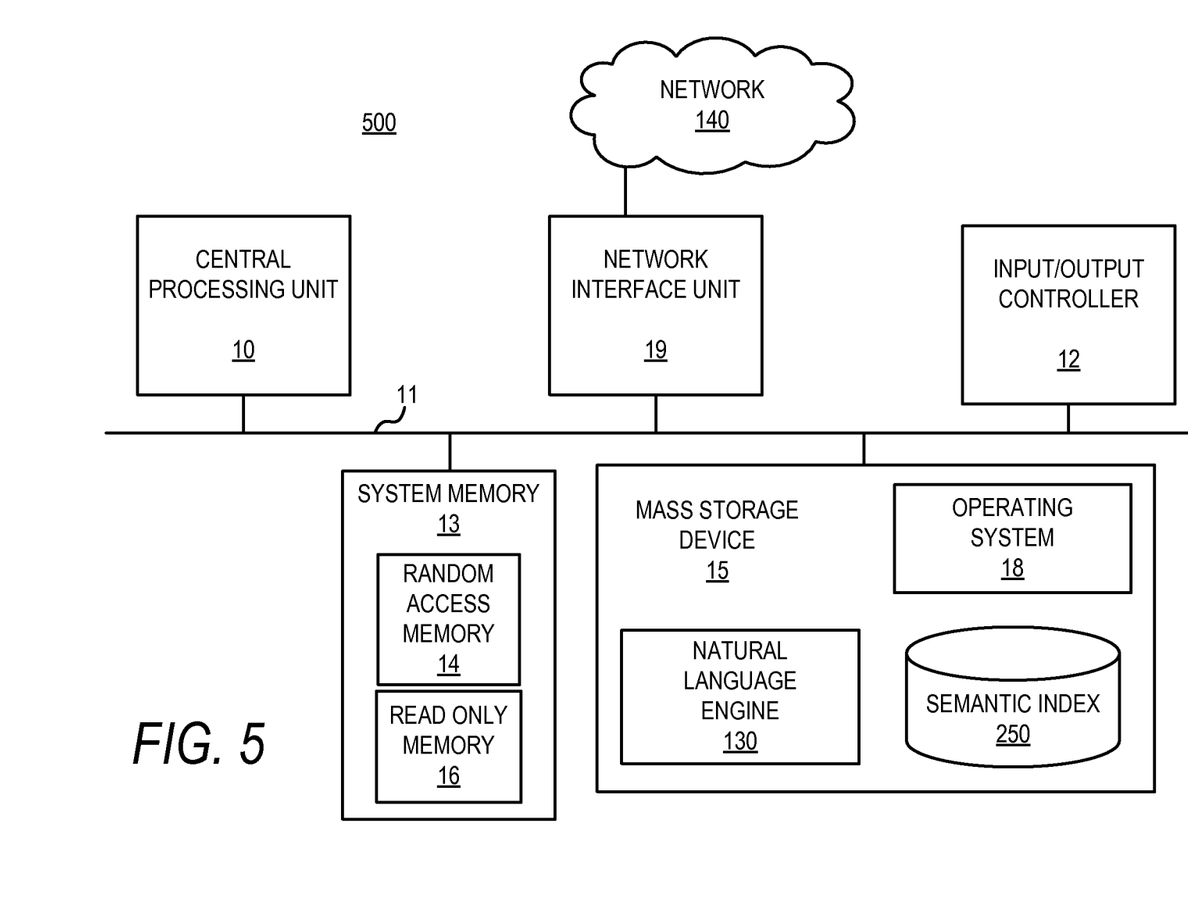
FIG. 5 is a computer architecture diagram showing an illustrative computer hardware and software architecture for a computing system capable of implementing aspects of an embodiment presented herein.

Turning now to FIG. 5, an illustrative computer architecture 500 can execute software components described herein for coreference resolution in an ambiguity-sensitive natural language processing system. The computer architecture shown in FIG. 5 illustrates a conventional desktop, laptop, or server computer and may be utilized to execute any aspects of the software components presented herein. It should be appreciated however, that the described software components can also be executed on other example computing environments, such as mobile devices, television, set-top boxes, kiosks, vehicular information systems, mobile telephones, embedded systems, or otherwise. Any one or more of the client computers 110A-110D or sever computers 120 may be implemented as computer system 500 according to embodiments.

The computer architecture illustrated in FIG. 5 can include a central processing unit 10 (CPU), a system memory 13, including a random access memory 14 (RAM) and a read-only memory 16 (ROM), and a system bus 11 that can couple the system memory 13 to the CPU 10. A basic input/output system containing the basic routines that help to transfer information between elements within the computer 500, such as during startup, can be stored in the ROM 16. The computer 500 may further include a mass storage device 15 for storing an operating system 18, software, data, and various program modules, such as those associated with the natural language engine 130. The natural language engine 130 can execute portions of software components described herein. A semantic index 250 associated with the natural language engine 130 may be stored within the mass storage device 15.

The mass storage device 15 can be connected to the CPU 10 through a mass storage controller (not illustrated) connected to the bus 11. The mass storage device 15 and its associated computer-readable media can provide non-volatile storage for the computer 500. Although the description of computer-readable media contained herein refers to a mass storage device, such as a hard disk or CD-ROM drive, it should be appreciated by those skilled in the art that computer-readable media can be any available computer storage media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network such as the network 140. The computer 500 may connect to the network 140 through a network interface unit 19 connected to the bus 11. It should be appreciated that the network interface unit 19 may also be utilized to connect to other types of networks and remote computer systems. The computer 500 may also include an input/output controller 12 for receiving and processing input from a number of other devices, including a keyboard, mouse, or electronic stylus (not illustrated). Similarly, an input/output controller 12 may provide output to a video display, a printer, or other type of output device (also not illustrated).

As mentioned briefly above, a number of program modules and data files may be stored in the mass storage device 15 and RAM 14 of the computer 500, including an operating system 18 suitable for controlling the operation of a networked desktop, laptop, server computer, or other computing environment. The mass storage device 15, ROM 16, and RAM 14 may also store one or more program modules. In particular, the mass storage device 15, the ROM 16, and the RAM 14 may store the natural language engine 130 for execution by the CPU 10. The natural language engine 130 can include software components for implementing portions of the processes discussed in detail with respect to FIGS. 2-4. The mass storage device 15, the ROM 16, and the RAM 14 may also store other types of program modules. The mass storage device 15, the ROM 16, and the RAM 14 can also store a semantic index 250 associated with the natural language engine 130.

Based on the foregoing, it should be appreciated that technologies for coreference resolution in an ambiguity-sensitive natural language processing system are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for integrating coreference resolution mechanisms, the method comprising:
retrieving, using a natural language engine of a server computer, a portion of text;
identifying, using the natural language engine of the server computer, a coreference within the portion of text;
extracting, using the natural language engine of the server computer, a fact from the portion of text, the fact having a meaning;
identifying an ambiguity within the portion of the text; and
expanding, using the natural language engine of the server computer, the fact to an expanded fact comprising
a coreferent meaning other than the meaning and based upon the identified coreference, and
an ambiguous meaning based on the identified ambiguity.

2. The method of claim 1, wherein identifying the coreference within the portion of text comprises identifying the coreference within the portion of text utilizing, at least in part, a syntactic parsing.

3. The method of claim 1, wherein identifying the coreference within the portion of text comprises identifying the coreference within the portion of text utilizing, at least in part, a semantic mapping.

4. The method of claim 1, wherein identifying the coreference comprises identifying an ambiguous coreference.

5. The method of claim 1, further comprising storing the expanded fact into an index operable to support information retrieval.

6. The method of claim 5, further comprising retrieving the expanded fact from the index in response to a search query.

7. The method of claim 1, further comprising annotating identified coreferences within the portion of text.

8. The method of claim 2, further comprising caching information from the syntactic parsing.

9. An optical disk storage device, magnetic disk storage device, or solid state storage device having computer executable instructions stored thereon which, when executed by a computer, cause the computer to:
retrieve a portion of text;
identify a coreference within the portion of text;
extract a fact from the portion of text, the fact having a meaning;
identifying an ambiguity within the portion of the text, and
expand the fact to comprise
a coreferent meaning other than the meaning and based upon the identified coreference, and
an ambiguous meaning based on the identified ambiguity.

10. The optical disk storage device, magnetic disk storage device, or solid state storage device of claim 9, wherein the instructions to identify the coreference comprise instructions to identify the coreference within the portion of text utilizing, at least in part, a syntactic parsing.

11. The optical disk storage device, magnetic disk storage device, or solid state storage device of claim 9, wherein the instructions to identify the coreference comprise instructions to identify the coreference within the portion of text utilizing, at least in part, a semantic mapping.

12. The optical disk storage device, magnetic disk storage device, or solid state storage device of claim 9, wherein the instructions to identify the coreference comprise instructions to identify an ambiguous coreference.

13. The optical disk storage device, magnetic disk storage device, or solid state storage device of claim 9, having further computer executable instructions stored thereon which, when executed by the computer, cause the computer to store the expanded fact into an index operable to support information retrieval.

14. The optical disk storage device, magnetic disk storage device, or solid state storage device of claim 13, having further computer executable instructions stored thereon which, when executed by the computer, cause the computer to retrieve the expanded fact from the index in response to a search query.

15. The optical disk storage device, magnetic disk storage device, or solid state storage device of claim 9, having further computer executable instructions stored thereon which, when executed by the computer, cause the computer to annotate identified coreferences within the portion of text.

16. A method for integrating coreference resolution mechanisms, the method comprising:

retrieving, using a natural language engine of a server computer, a portion of text;

identifying, using the natural language engine of the server computer, a coreference within the portion of text;

identifying, using the natural language engine of the server computer, an ambiguity within the portion of text;

extracting, using the natural language engine of the server computer, a fact from the portion of text, the fact having a meaning;

expanding, using the natural language engine of the server computer, the fact to comprise
  a coreferent meaning other than the meaning and based upon the identified coreference, and
  an ambiguous meaning based on the identified ambiguity;

storing the expanded fact into an index operable to support information retrieval; and retrieving the expanded fact from the index in response to a search query.

* * * * *